United States Patent

Smith

[15] 3,682,321
[45] Aug. 8, 1972

[54] THROW-AWAY FILTER ASSEMBLY

[72] Inventor: Anthony William Smith, Las Vegas, Nev.

[73] Assignee: Volu-Sol Chemical and Manufacturing Company, Inc.

[22] Filed: March 2, 1970

[21] Appl. No.: 15,635

[52] U.S. Cl. ................................210/477, 210/482
[51] Int. Cl. ................................................B01d 29/04
[58] Field of Search ..210/446, 94, 477, 482; 23/259, 23/292

[56] References Cited

UNITED STATES PATENTS

| | | | |
|---|---|---|---|
| 3,316,908 | 5/1967 | Burke | 210/94 X |
| 2,378,949 | 6/1945 | Post | 23/292 X |
| 2,160,571 | 5/1939 | Bates | 210/94 |
| 2,775,350 | 12/1956 | Jones | 210/446 |
| 3,608,736 | 9/1971 | Wong | 210/477 |

Primary Examiner—Reuben Friedman
Assistant Examiner—Frederick F. Calvetti
Attorney—Robert E. Geauque

[57] ABSTRACT

The filter assembly has a body which rests upon the open end of a test tube. The specimen is introduced into the specimen tube portion of the filter assembly and the bottom of the specimen tube has a partition which contains a small drain opening. A drain tube connects the drain opening with the interior of the test tube. A filter element is located across the specimen tube and can be supported by the partition or by a separate support member. The partition has a portion extending from the specimen tube which mounts a plurality of sleeves or projections extending downwardly to engage the mouth of the test tube in order to maintain the filter assembly generally upright. The body can be molded of plastic and the filter element is easily assembled so that the complete filter assembly is inexpensive and can be thrown away after each procedure. The filter assembly can be employed in an improved procedure for calcium determination. This procedure eliminates the use of a centrifuge to separate the precipitate produced during the procedure, and results in considerable time saving and avoids loss of calcium.

6 Claims, 7 Drawing Figures

PATENTED AUG 8 1972 3,682,321
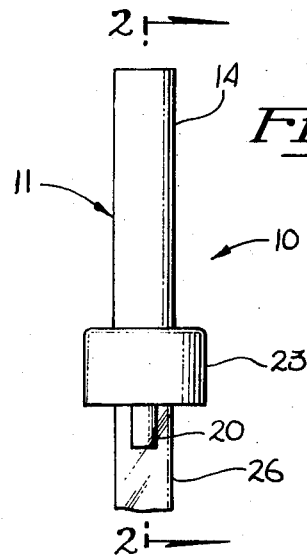
Fig.1
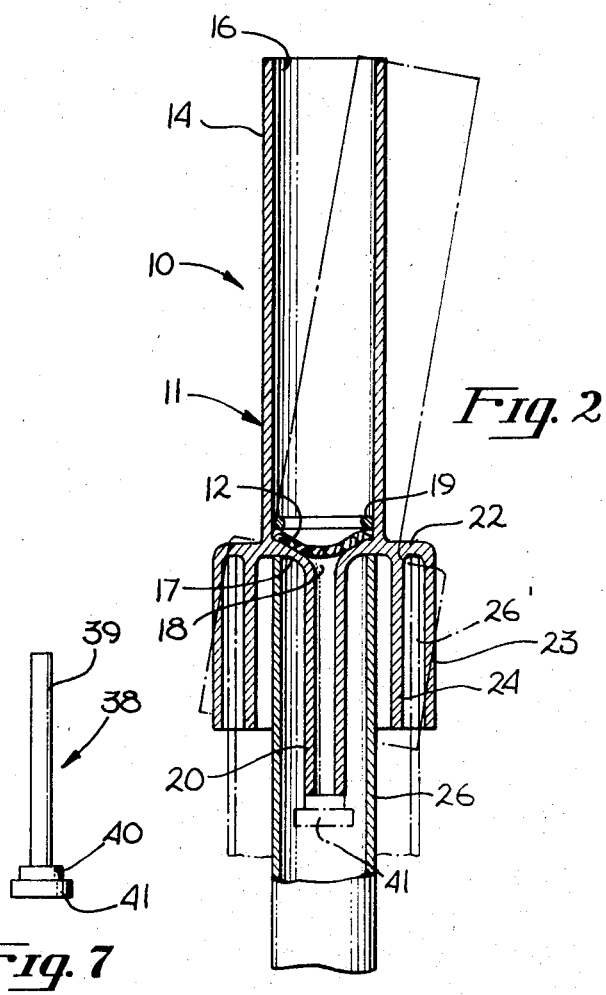
Fig.2
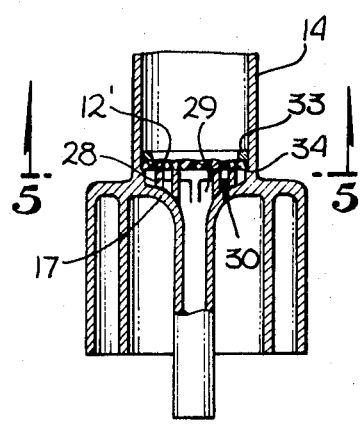
Fig.4
Fig.7
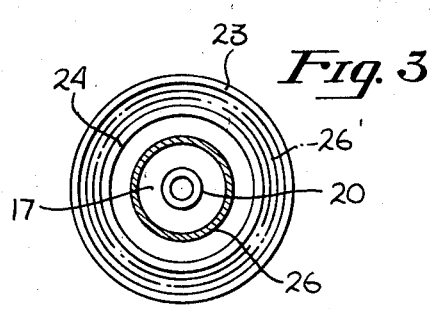
Fig.3
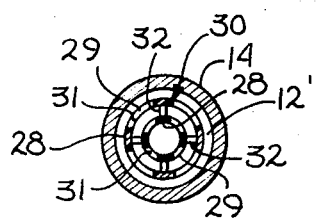
Fig.5
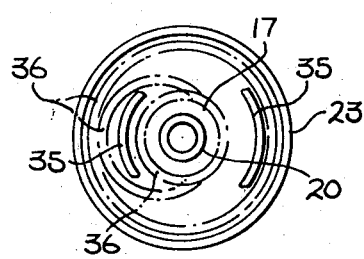
Fig.6
ANTHONY W. SMITH
INVENTOR.
BY R. E. Geauque
ATTORNEY 3,682,321

THROW-AWAY FILTER ASSEMBLY

BACKGROUND OF THE INVENTION

In the clinical procedures for testing for certain components in a serum, plasma, urine, or other body material, a centrifuge has been used to separate in a test tube the various components of the specimen. For instance, in the Ferro-Ham procedure for calcium determinations, a Reagent No. 1 is added to the specimen to precipitate the calcium as calcium chlorinate. In order to separate the precipitate from the remaining liquid, the test tube is allowed to stand for about 30 minutes and is then placed in a centrifuge for about 10 minutes at high speed in order to pack the precipitate in the bottom of the tube. The remaining liquid (supernatant) is then removed by pouring off or decanting and the precipitate is then washed with Reagent No. 2 to resuspend the precipitate. It is then necessary to repeat the centrifuge and draining steps for at least the same period of time as before. Finally, Reagent No. 3 is added to dissolve the precipitate and the calcium content is determined in a spectrometer at 520 mu. The decanting and draining off of the fluid from the precipitate results in the loss of precipitate which will produce a faulty test result. In the test procedures for other substances, it is also necessary to separate a precipitate from the remaining fluid of a sample so that a determination can be made from the precipitate or the remaining fluid. For instance, in the determination of iron binding capacity, the suspended solid particles are removed from the specimen and the final reading is obtained from the remaining fluid. In this test, the separation of the particles from the fluid can be done by a centrifuge. However, the use of a centrifuge to separate the particles is time consuming and requires the constant presence of the laboratory technician. It is understood that the filter element is capable of removing precipitate and/or various solid particles as required in any test procedure.

SUMMARY OF THE INVENTION

The present invention provides a throw-away filter assembly and method of its use in which the precipitate in a test specimen can be quickly and accurately separated from the remaining fluid so that the test can proceed with either one of the separated portions. The filter assembly consists of a tube which is open at one end to receive the test specimen and which has a partition containing a drain hole at the other end. The hole connects with a small drain tube leading into a test tube located below the filter assembly. The partition provides a surface for supporting a filter element formed of fiberglas or some other suitable material. An enlarged sleeve is attached to the partition end of the tube and surrounds the drain tube. The enlarged sleeve is of sufficient diameter to just fit over the open end of the largest test tube intended to be used with the filter assembly in order to retain the filter assembly upright over the open end of the tube. Extending into the enlarged sleeve from the partition end are one or more projections or sleeves which cooperate with the open end of tubes of smaller diameter to prevent the filter assembly from tipping when placed over the open end of such smaller tubes. The filter element can be supported directly by the end partition or can be supported above the end partition by a suitable spacer member. Also, a plug can be used to selectively close the drain tube.

By utilizing the filter assembly, a test procedure for calcium determination has been developed which eliminates the time consuming centrifuging step required in the Ferro-Ham procedure. After Reagent No. 2 has been added, the specimen is poured into the filter assembly which has been placed on top of a waste test tube. The precipitate collected on the filter element can thereafter be washed with Reagent No. 2. The filter assembly is then transferred to a cuvette and a measured amount of Reagent No. 3 is added to the precipitate to cause the precipitate to dissolve and pass through the filter element into the cuvette. Thereafter, the solution in the cuvette can be read in a photometer at 520 mu. Other procedures, such as the test for iron binding capacity, can also be improved by the use of the filter assembly.

Since the body of the filter assembly can be molded of plastic and an inexpensive filter element can be installed therein, the filter assembly is intended to be thrown away after a single use in order to eliminate the necessity of washing the assembly and replacing the filter element.

It is therefore an object of the present invention to provide a throw-away filter assembly which can be utilized in clinical procedures with various sizes of test tubes.

Another object of the invention is to provide improved test procedures utilizing a filter.

BRIEF DESCRIPTION OF THE DRAWINGS

FIG. 1 is a side elevational view of the filter assembly;

FIG. 2 is a section along line 2—2 of FIG. 1 showing the filter element in place;

FIG. 3 is an end elevational view along line 3—3 of FIG. 2 showing the enlarged end which rests on a test tube;

FIG. 4 is a partial sectional view similar to FIG. 2 of a modified filter element positioned in the filter assembly;

FIG. 5 is a section along line 5—5 of FIG. 4;

FIG. 6 is an end elevational view similar to FIG. 3 showing a plurality of prongs for cooperating with different size test tubes; and FIG. 7 is a side elevational view of a stopper for interrupting the flow through the filter assembly.

DESCRIPTION OF THE PREFERRED EMBODIMENT

The filter assembly 10 comprises a filter body 11 which receives and supports filter element 12. Body 11 comprises a specimen tube 14 which has an open end 16. A partition 17 is located across the opposite end and has a central drain hole 18 connecting with drain tube 20. The partition curves outwardly from the end of tube 14 to the hole 18 in order to provide a substantially tapered surface leading to the hole 18. Filter element 12 comprises a thin disc of the filter material, such as Type A or Type E glass fiber distributed by Gelman Instrument Company of Ann Arbor, Mich., having a thickness of about 1/64 inch. The filter disc is slightly larger than the tube 14 and is inserted into the open end 16 until it seats on the partition 17 and covers the hole 18. A small plastic retaining ring 19 is then inserted into the tube 14 until it engages the edge of the filter element. The ring frictionally engages the side of tube 14 and holds the filter disc in place. Since the ring is not forced against the disc, the compactness of the filter disc is not substantially affected by the ring. The partition 17 has an annular exterior flange 22 extending transversely outwardly from the end of tube 14 and circular sleeves 23 and 24 are connected to and project downwardly from said flange.

In use, the filter assembly is in about upright position and rests on the open end of a test tube, such as tube 26, and the drain tube 20 extends downwardly into the test tube. Generally, the open end diameter of test tubes to be used with the filter assembly range between ¼ inch and ¾ inch. If a small tube 26 is used, the tube mouth will be located between sleeve 24 and drain tube 20 so that it will engage one of these members if the filter assembly tips substantially from the upright, as illustrated by the phantom line position of the filter assembly in FIG. 2. If a larger tube 26' is used, the tube mouth will be located between sleeves 23 and 24 in order to prevent tipping of the filter assembly. The end of drain tube 20 extends beyond the sleeves 23 and 24 to permit a vacuum tube to be attached to the drain tube, if desired.

When a fluid specimen is inserted into end 16 of specimen tube 14, any precipitate will be retained on filter element 12 and the fluid will pass through drain tube 20 into test tube 26. Because of the taper of partition 17 toward drain hole 18, the precipitate will be directed to and collected by the part of the filter element which is opposite hole 18 and unsupported by the partition. By having the precipitate at this location, a substance can be added to tube 14 which flows through and washes all the precipitate or flows through and dissolves all the precipitate in order to deposit it in the test tube below the filter assembly. Since the precipitate is primarily located on an unsupported portion of the filter element, there is no interference by the partition which could resist the flow of washing or dissolving fluids through all of the precipitate.

It is understood that the size of the filter assembly can be varied to be compatible with the size of the specimen used in a particular determination and that the thickness, material and pore size of the filter element can be selected to meet the particular test requirements. Also, since the filter body 11 can be molded in one piece from a suitable plastic and the disc filter element can be die cut, it is apparent that the filter assembly is inexpensive and that a new one can be used for each test.

As illustrated in FIGS. 4 and 5, the filter element 12' can be positioned above the partition 17 by a support member 30 comprising a plurality of concentric short ring plates 31 connected together by ribs 32 and each ring is supported above partition 17 by a plurality of feet 28 which engage partition 17 and have fluid flow opening 29 therebetween. The filter element is supported flat upon the member 30 and is retained thereon by a plastic retaining ring 33 which frictionally engages tube 14. A slight ledge 34 can be formed on the interior of tube 14 to help position and support the circumference of the filter element. Since the edge thickness of each ring plate is small, the support member is open to flow therethrough and substantially no interference is presented to the washing or dissolving of the precipitate on the entire filter element. Any suitable material can be used for element 12', such as paper thin material designated GA-6 which is a trademark of Gelman Instrument Company. While the filter assembly of FIG. 4 utilizes an additional member 30, it is almost an inexpensive as the assembly of FIG. 2 and can be thrown away after one usage. Further, this filter assembly produces accurate, reproduceable test results since the precipitate can be completely separated by, washed on or removed from the filter element without decanting or pouring off.

As illustrated in FIG. 6, the sleeves 23 and 24 can be replaced by a plurality of curved outward projections 35 spaced at different diameters from the tube 20 so that the projections can engage with different tube mouth sizes to prevent substantial tipping of the filter assembly regardless of test tube size. Also, in some applications, it may be desirable to retain the specimen in the tube 14 for a period of time before the filtering action takes place, and a glass or plastic stopper 38 shown in FIG. 7 can be used for this purpose. The stopper comprises a solid stem 39 which fits tightly into drain tube 20 to prevent fluid passage. The step 40 will engage the end of tube 20 and the enlarged end 41 can be used to insert and remove the stopper.

The filter assembly of the present invention makes possible an improvement in the prior calcium test procedure of Ferro-Ham. As in this prior test, a measured amount of a specimen is first placed in a small test tube and a measured amount of Reagent No. 1 is added. After mixing well, the contents are allowed to stand at room temperature for about 30 minutes. Reagent No. 1 is a chloranilic acid solution which precipitates calcium as calcium chlorinate and the precipitate settles down in the bottom of the test tube. At this point, the test procedure departs from the Ferro-Ham procedure. The test tube is shaken well to resuspend the precipitate and the contents poured into the end 16 of the filter assembly which has been placed on top of a waste test tube. The test tube is then washed with Reagent No. 2 to pick up any residual precipitate and the Reagent No. 2 is then poured through the filter assembly to wash the precipitate collected on the filter element. Reagent No. 2 is isopropyl alcohol 25 percent and all this wash solution is allowed to run through the filter element into the waste test tube, which is then discarded.

The filter assembly containing the precipitate is then placed on top of a cuvette after shaking off any residual wash solution. A measured amount of Reagent No. 3 (EDTA Na 4 solution) is slowly added to the filter assembly and dissolves the precipitate as it runs through the filter element into the cuvette. If any discoloration remains on the filter pad, a portion of the filtered solution is transferred from the cuvette back into the filter assembly, allowing this solution to filter back into the cuvette. This procedure is continued until the filter element or pad is without color.

When the filtration is complete, the filter assembly is removed from the cuvette and discarded. The contents of the cuvette is mixed well and allowed to stand for five minutes, thereby providing a color complex which is stable for five days.

To obtain the calcium determination, the cuvette is placed in a photometer set at a wavelength of 520 mu, using a water bank. The optical density of percent transmission of the solution is compared against that of a standard solution to obtain the calcium content. In other words, the ratio of density of the unknown to the density of the standard times the concentration of the standard equals the mgs percent of calcium in the unknown.

Since this procedure does not make use of a centrifuge, it results in a time savings of about two hours. The total time required to separate the precipitate on the filter element is about 10 minutes whereas the two centrifuge steps of the Ferro-Ham procedure require approximately one to two hours to pack the precipitate in the bottom of the tube, depending upon the type of centrifuge and speed utilized. Further, the prior Ferro-Ham procedure requires that after each centrifuge step, the remaining liquid (supernatant) be decanted and/or poured off and this can result in the loss of a certain amount of the precipitate, thereby affecting the final test result. Thus, the present procedure has the advantage of time saving and of accuracy. Because of the low cost of the filter assembly, it can be thrown away after each determination and a new one used for the next determination and the overall cost of the procedure is less than that of the prior procedure when the expense of centrifuging is considered. It is understood that the Reagent Nos. 1, 2 and 3 are well known and are the same as used in the prior Ferr-Ham determinations.

A modified test procedure for calcium utilizes the glass plug 38 which is inserted into the drain tube 20 before the specimen is placed in the filter assembly. With the specimen in the assembly, Reagent No. 1 is added and the mixture allowed to set for about 30 minutes in order to produce the precipitate. The glass plug is then pulled out to permit the remaining solution to pass through the filter element. Thereafter, the determination proceeds with Reagent No. 2 as outlined above. This modification eliminates the use of a separate test tube to produce the precipitate.

The filter assembly and filter element of FIG. 4 is useful in test procedures, such as that for iron binding capacity, where the solid particles must be removed from a solution before the test results are obtained from the solution. In such case, the particles are removed by the filter element 12' and then the complete filter assembly can be thrown away. The element 12' and support 30 provide a larger unsupported filter area than is available from filter element 12 of FIG. 1. The filter assembly of FIG. 4 could be used for the calcium determination, but the filter assembly of FIG. 1 is preferred since it provides the required filter area and is slightly less expensive.

I claim:

1. A throw-away filter assembly for use in clinical procedures employing a test specimen comprising:
    a normally upright tube having an open end for receiving the specimen;
    a substantially transverse partition at the opposite end of said specimen tube;
    an opening in said partition connecting with a drain tube;
    a filter element extending transversely across said specimen tube above said opening for filtering said specimen;
    said drain tube projecting loosely into the open end of a test tube for discharging the fluid passing through said filter element into said test tube;
    an extension flange extending transversely outwardly from said opposite end; and
    mounting means extending downwardly from said flange constructed and arranged to receive the open ends of test tubes of different diameters to prevent substantial tipping of said filter assembly while resting on the open end of any one of the tubes.

2. A throw-away filter assembly as defined in claim 1 wherein said partition slopes outwardly from said opposite end to said opening;
    said filter element comprising a disc of filter material which engages the sloping surface of said partition and extends over said opening.

3. A throw-away filter assembly as defined in claim 2 having a plastic ring located above the circumference of said disc to retain said disc adjacent said partition.

4. A throw-away filter assembly as defined in claim 1, said downwardly extending mounting means comprising at least two concentric sleeves connected to and projecting downwardly from said extension flange, the diameters of said sleeves being such as to receive the open ends of test tubes of different diameters and prevent substantial tipping of said filter assembly while resting on the open end of any one of said tubes.

5. A throw-away filter assembly as defined in claim 1, said downwardly extending means comprising a plurality of projections extending downwardly from said extension flange, the location of said projections being such as to receive the open ends of test tubes of different diameters and prevent substantial tipping of said filter assembly while resting on the open end of any one of said tubes.

6. A throw-away filter assembly as defined in claim 1 wherein said partition slopes outwardly from said opposite end to said opening, an open support member having one side in engagement with said partition and having an opposite side defining a flat surface spaced from said opening; and
    a flat filter element located on said opposite side.

* * * * *